Patented June 25, 1946

2,402,684

UNITED STATES PATENT OFFICE 2,402,684

HYDROGENATION CATALYSTS AND METHODS OF PREPARATION

Frank Kerr Signaigo, Wilmington, Del., assignor to E. I. du Pont de Nemours & Company, Wilmington, Del., a corporation of Delaware No Drawing. Application February 16, 1940, Serial No. 319,242

15 Claims. (Cl. 252—228.4)

This invention relates to metal sulfide catalysts for use in hydrogenation reactions and to methods of preparing such catalysts.

The literature on the use of metal sulfide catalysts for the destructive hydrogenation of carbonaceous materials is very extensive. Such metal sulfides are prepared by a variety of methods such as precipitation, decomposition of thio salts, and heating metals or metal compounds with volatile sulfur-containing materials such as sulfur, hydrogen sulfide, carbon bisulfide, mercaptans, etc.

The metal sulfide catalysts described in the literature are active for the destructive hydrogenation of carbonaceous materials and desulfurization of petroleum and gases at high temperature, as for example 300° to 600° C. These drastic conditions of temperature are not suitable for carrying out certain desirable hydrogen reductions of organic compounds, since extensive cracking and hydrogenolysis results and mixtures of hydrocarbons are obtained. It is therefore essential to the successful hydrogen reduction of many organic sulfur compounds that the catalysts employed be active at low temperatures so that simple addition of hydrogen or cleavage by hydrogen will occur without accompanying disruptive side reactions. The catalyst must of course be immune to sulfur poisoning if sulfur or sulfur compounds are involved.

This invention has as an object the preparation of certain new and useful sulfactive catalysts. Another object is the preparation of a new class of hydrogenation catalysts. A further object is to prepare hydrogenation catalysts by an economical and simple process. A still further object is the preparation of hydrogenation catalysts that are active under mild conditions of temperature. Another object is to develop certain new processes for the production of such catalysts. Other objects will be apparent from the reading of the following description of the invention.

These objects are accomplished by the following invention which comprises treating a metal polysulfide, obtainable by precipitation from a solution of a salt of a metal of the iron group of the periodic table, with hydrogen at a temperature between 25° and 300° C. The treatment with hydrogen may be carried out as a separate operation or in conjunction with the use of the metal sulfide as a hydrogenation catalyst.

In practicing this invention a salt of a metal of the iron group of the periodic table is dissolved in water with stirring, and to the stirred solution is added slowly an aqueous solution of sodium polysulfide. The precipitated ferrous metal polysulfide is then filtered from the liquid medium and washed with water to remove soluble salts. The precipitate is protected from oxidation by the atmosphere by means of a liquid medium such as water or organic solvents. The paste is then dried in a non-oxidizing atmosphere of carbon dioxide, nitrogen, hydrogen, etc., and finally reduced in an atmosphere of hydrogen at a temperature of 50° to 200° C. Alternatively, the metal sulfide paste may be mixed with the material to be hydrogenated and the hydrogen treatment of the catalyst carried out under hydrogen pressure at an elevated temperature in a hydrogenation autoclave so as to activate the catalyst in situ. The details of carrying out this invention will vary according to the particular ferrous metal sulfide prepared and depending upon the type of material to be hydrogenated. The following selected examples indicate more precisely the manner of practicing this invention. The proportions of materials used are expressed as parts by weight unless otherwise stated.

Example I

A catalyst active for the hydrogenation of sulfur compounds is prepared as follows: Two hundred thirty-seven parts of cobalt chloride hexahydrate was dissolved in 500 parts of water. To this was added rapidly with stirring a solution of 240 parts of sodium sulfide nonahydrate and 64 parts of sulfur in 900 parts of water. A black precipitate was formed which was filtered and washed with water to remove soluble salts. The precipitate was then further washed with alcohol to free it from water. The cobalt polysulfide must be protected from oxygen or air due to its pyrophoric nature. The paste was then placed in a tube fitted in an electric furnace and heated in a stream of hydrogen. The evolution of hydrogen sulfide commenced at a temperature of 60° C. At 100° C. the evolution of hydrogen sulfide was very vigorous. As the temperature was slowly raised to 200° C., the evolution of hydrogen sulfide gradually decreased, and after 1 hour at this temperature reduction was sufficiently complete. This reduced catalyst must be protected from air, since it is pyrophoric.

The catalyst so prepared is unusually active for the hydrogenation of sulfur compounds, as will be seen from the following example. A mixture of 98 parts of cyclohexanone and 32 parts of sulfur was heated in an autoclave with 9 parts of the catalyst described above. The autoclave was charged with hydrogen at 2,000 lbs./sq. in. pressure and agitated and heated to 175° C. Under these conditions the pressure in the autoclave dropped very rapidly, and it was necessary to add hydrogen from time to time to maintain the pressure in the range from 1,000 to 2,000 lbs./sq. in. The total pressure drop in three hours amounted to 2,100 lbs./sq. in., after which no further hydrogen absorption was noted. On cooling the autoclave and filtering the product from the catalyst there was obtained cyclohexanethiol in 74% conversion. I believe this type of hydrogenation reaction proceeds as follows:

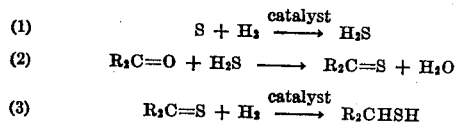

(1) $S + H_2 \xrightarrow{catalyst} H_2S$ (2) $R_2C=O + H_2S \longrightarrow R_2C=S + H_2O$ (3) $R_2C=S + H_2 \xrightarrow{catalyst} R_2CHSH$

Example II

It will be noted that in reducing the cobalt polysulfide with hydrogen, as described in the preceding example, the evolution of hydrogen sulfide commenced at 60° C. and was very vigorous at 100° C. It is evident, therefore, that the reduction with hydrogen can conveniently be carried out under the conditions used for hydrogenation reactions. This is shown by the following experiment. A solution of 237 parts of cobalt chloride was precipitated with a solution of 240 parts of sodium sulfide saturated with sulfur. The precipitate was filtered and washed with water and finally with alcohol. Ten parts of this unreduced precipitated cobalt polysulfide was charged into a hydrogenation autoclave with 98 parts of cyclohexanone and 32 parts of sulfur. Hydrogen was admitted to the autoclave to a pressure of 2,000 lbs./sq. in and the autoclave was heated to 150°. Hydrogen was absorbed slowly at first while the cobalt polysulfide was being reduced to the active catalyst. After a few minutes, however, a rapid absorption of hydrogen took place and more hydrogen was added to maintain the pressure above 1,000 lbs./sq. in. After 4 hours no more hydrogen was absorbed, and on working up the contents of the autoclave cyclohexanethiol was obtained in an amount corresponding to a conversion of 80% of the cyclohexanone.

The freshly precipitated cobalt polysulfide contained 1.65 parts of sulfur per part of cobalt. The catalyst after use was found to be reduced to a material having 1 part of cobalt to 0.76 part of sulfur. This is the active form of the catalyst. The used catalyst was still active and can be used again without undergoing further reduction.

Example III

By way of contrast the above experiment was duplicated except that a cobalt sulfide catalyst prepared by the methods disclosed in U. S. Patents 1,932,186; 1,955,829; 1,960,977; 2,038,599; and 2,127,382 was used.

Seventy-five parts of CP cobaltic oxide was heated in a stream of hydrogen sulfide at a temperature of 350° C. for 4 hours. The product was a dark grey, friable mass which was then finely pulverized before use. Five parts of the cobalt sulfide catalyst prepared in this manner was charged into a hydrogenation autoclave together with 60 parts of cyclohexanone and 30 parts of sulfur. The autoclave was agitated and hydrogen was introduced to a pressure of 2,000 lbs. per sq. in. The autoclave was then heated to a temperature of 150° C. for 3 hours, but during this period there was no apparent hydrogen absorption. The temperature was raised accordingly to 170° C. and the pressure decreased only 400 lbs. in 3 hours. No further hydrogen absorption was noted. The contents of the autoclave were then filtered to separate the catalyst and worked up as described above. Cyclohexanethiol was obtained in only 3.6% yield, indicating that little reaction had occurred.

Example IV

An active nickel sulfide catalyst was prepared as follows: Ninety parts of nickel sulfate hexahydrate was dissolved in 250 parts of water and to the stirred solution there was added a solution of 80 parts of sodium sulfide nonahydrate and 21 parts of sulfur dissolved in 300 parts of water. The black precipitate was filtered and washed several times with water to remove the soluble salts. Fifteen parts of the nickel sulfide so prepared was charged into an autoclave with 100 parts of pentadecanone-8, 33 parts of sulfur, and 50 parts of acetic acid. Hydrogen was admitted to the autoclave to a pressure of 2,300 lbs./sq. in. and the autoclave heated to 150° C. while being agitated. After a few minutes hydrogen was absorbed rapidly at this temperature but after one-half hour reaction became slower. The temperature was then raised to 200° C. and further absorption of hydrogen occurred until after a total time of 2.5 hours no further absorption of hydrogen was noted. On working up the reaction mixture pentadecanethiol-8 was obtained in 80% yield.

Example V

Ten parts of cobalt polysulfide catalyst prepared as in Example II and made into a thick paste with acetic acid was charged into an autoclave, together with 90 parts of methyl butyl ketone and 32 parts of sulfur. Hydrogen was forced into the autoclave to a pressure of 2,000 lbs./sq. in. and the autoclave heated to 150° C. At this temperature the absorption of hydrogen became very rapid and additional hydrogen was added to maintain the pressure in the range of 1,200–2,000 lbs./sq. in. After 1.5 hours the absorption of hydrogen had ceased, indicating the completion of the reaction. After removing the catalyst, the contents of the autoclave were distilled and there was obtained hexanethiol-2 in an amount corresponding to 66% conversion from the ketone.

In contrast to these results obtained with a catalyst prepared according to this invention, the following experiment shows the inferior performance of a cobalt monosulfide such as is described in the literature. Cobalt monosulfide was prepared by precipitation from a solution of cobalt chloride by means of a solution containing an equivalent amount of sodium monosulfide. The black precipitate of cobalt monosulfide was filtered, washed with water, and made into a paste with acetic acid. Ten parts of this cobalt monosulfide was charged, together with 90 parts of methyl butyl ketone and 32 parts of sulfur, into an autoclave. Hydrogen was added to a pressure of 2,000 lbs./sq. in. and the autoclave heated to 150° C. Hydrogen was absorbed during the initial half hour, and the absorption ceased thereafter. The temperature was then raised to 175° C. but no further absorption of hydrogen occurred. After cooling the autoclave the contents were worked up as described previously and there was obtained hexanethiol-2 in an amount corresponding to 27% conversion from the ketone. A comparison of this result with that obtained in the preceding example shows the greater catalytic activity of the catalyst prepared by reducing cobalt polysulfide.

*Example VI*

This difference in activity of monosulfides prepared according to prior art methods for obtaining sulfactive catalysts and catalysts prepared according to this invention was also encountered in the case of nickel and iron sulfides. For example, the behavior of two preparations of iron sulfide is given below. An iron sulfide catalyst was prepared according to my method as follows. A solution containing 80 parts of sodium sulfide nonahydrate and 21 parts of sulfur in 300 parts of water was added with stirring to a solution of 95 parts of ferrous sulfate heptahydrate in 250 parts of water. The black precipitate is filtered, washed several times with water and finally with alcohol. Fifteen parts of the sulfide so prepared was charged into an autoclave, together with 100 parts of pentadecanone-8, 33 parts of sulfur, and 50 parts of acetic acid. Hydrogen was added to the autoclave to a pressure of 2,000 lbs./sq. in. and the autoclave heated to a temperature of 150-200° C. After 7 hours the total pressure drop had amounted to 1,800 lbs./sq. in. On working up the reaction product, there was obtained pentadecanethiol-8 in 50% conversion from the ketone. The reduced catalyst was found to contain 1 part of iron to 1.2 parts of sulfur.

One hundred forty parts of ferrous sulfate heptahydrate was dissolved in 1000 parts of water and hydrogen sulfide gas bubbled through the solution. Some precipitate was formed. A solution of 170 parts of sodium monosulfide nonahydrate in 700 parts of water was added dropwise with stirring. The final solution was then treated again with hydrogen sulfide gas for one-half hour. The precipitate was filtered and washed several times with water. Fifteen parts of the sulfide so prepared was charged into an autoclave, together with 100 parts of pentadecanone-8, 33 parts of sulfur, and 50 parts of acetic acid. The autoclave was heated to 150° C. under a hydrogen pressure of 1,800 lbs./sq. in. After the absorption of hydrogen had ceased, the temperature was gradually raised to 200° C. until no further absorption of hydrogen occurred. On working up the reaction mixture there was obtained pentadecanethiol-8 in 10% conversion from the pentadecanone-8.

The ferrous metal sulfide catalysts prepared according to this invention are also active for other hydrogenations, as is shown by the following examples.

*Example VII*

One hundred fifty parts of cottonseed oil was charged, together with 15 parts of cobalt polysulfide prepared as in Example II, into an autoclave and hydrogen was added to a pressure of 3,000 lbs./sq. in. The temperature was raised to 200° C. and after two hours the absorption of hydrogen had ceased. After removing the contents from the autoclave and filtering off the catalyst, there was obtained the hydrogenated fat which melted at 44-50° C. and showed an iodine number of 44.5 as compared with 113 for the original unhydrogenated oil.

*Example VIII*

By way of contrast, the above experiment was repeated using a cobalt sulfide catalyst prepared by the method described in U. S. Patents 2,127,383 and 2,038,599.

Sixty parts of cobalt nitrate hexahydrate was dissolved in 200 parts of water and stirred with an excess of ammonium sulfide solution. The black precipitate was filtered and washed free from soluble salts with water and then heated in a current of hydrogen sulfide at a temperature of 200° C. for 12 hours. The black powder was then finely ground. Fifteen parts of the cobalt sulfide prepared in this manner was charged into an autoclave with 150 parts of cottonseed oil. Hydrogen was then added to the autoclave to a pressure of 3,000 lbs. per sq. in. and the autoclave heated to 200° C. for 4 hours. During this period very slight hydrogen absorption was apparent. The contents of the autoclave were filtered from the catalyst. The product obtained in this manner was a liquid at ordinary temperatures. It had an iodine number of 89, indicating that very little hydrogenation had occurred.

*Example IX*

One hundred twenty-five parts of cyclohexanone and 15 parts of reduced cobalt polysulfide catalyst prepared as described in Example I were charged into an autoclave which was then heated to 200° C. under a hydrogen pressure of 3,400 lbs./sq. in. After six hours the absorption of hydrogen had ceased, and the total pressure drop had amounted to 1,800 lbs./sq. in. After filtering off the catalyst, there was obtained by distillation a mixture containing 82% of cyclohexanol, together with some unhydrogenated cyclohexanone.

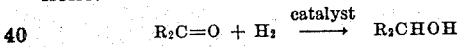

$$R_2C=O + H_2 \xrightarrow{\text{catalyst}} R_2CHOH$$

In the foregoing examples I have indicated certain specific procedures for preparing highly active ferrous group metal sulfide catalysts. It is apparent that one skilled in the art may vary the procedure used for preparing the catalysts without departing from the scope of this invention. For example, the ferrous group metal may be derived from any suitable salt, such as, for example, the chloride, sulfate, nitrate, acetate, bromide, etc. The valence of the metal in the original salt may be any of the common valences in which the metals exist. For example, cobaltous or cobaltic salts may be used, nickelous or nickelic, or ferrous or ferric salts.

The soluble polysulfide used as the precipitant may vary likewise. For example, the positive ion of the sulfide may be that of any of the alkali metals such as sodium, potassium, lithium, etc., and also the ammonium ion. It is also within the scope of this invention to use other soluble metal polysulfides, as for example those of the alkaline earth metals barium, calcium, strontium, and the like. In preparing catalysts according to this invention any convenient amount of sulfur may be contained in the polysulfide solution so long as it is more than one atom of sulfur for each two univalent positive ions or for each single divalent metal ion, etc. I prefer, however, to use solutions of sodium or ammonium polysulfide that contain between two and four atoms of sulfur for each two positive univalent ions. These polysulfide solutions may be obtained by a variety of methods. I have found it convenient to dissolve the alkali monosulfide in water and stir this solution with an amount of free sulfur calculated to yield the polysulfide desired until solution is complete. The alkali polysulfides may also be obtained by heating the hydrated monosulfides with free sulfur until the sulfur dissolves and thereafter diluting the mixture with water.

The precipitation may be carried out, as I have indicated, by adding the polysulfide solution to the cold, stirred, aqueous solution of ferrous group metal salt. However, other procedures may be adopted. For example, the metal salt may be added to the polysulfide solution and the precipitation may be carried out not only at room temperature but at higher or lower temperatures. While solvents such as alcohols and liquid ammonia may be used as precipitation media, I prefer to use water. The amount of water used in the precipitation and also the relative proportion of the reagents may be varied considerably. The precipitate may be washed with water to remove soluble salts, but in some cases it is convenient to use the crude precipitated mixture directly. Since the precipitated polysulfides rapidly oxidize in contact with oxygen or air, it is preferable to protect them against oxidation by an inert atmosphere or liquid, such as water, alcohol, benzene, and the like.

In preparing catalysts by the methods described, some free sulfur may be precipitated along with the ferrous group metal sulfide. It is usually not necessary to separate the sulfur from the metal sulfide but this may be accomplished if desired by extracting the crude precipitate with solvents for sulfur, as for example benzene, carbon bisulfide, solutions of ammonium or sodium monosulfides. When alkali polysulfides are employed as precipitants, some ferrous group metal hydroxide may be formed together with the insolubde sulfide. The presence of the metal hydroxide is not harmful to the activity of the catalyst, but if desired the metal sulfide may be obtained in purer form by digesting the crude precipitate with dilute organic or dilute mineral acid such as dilute sulfuric acid at ordinary or elevated temperatures to dissolve the metal hydroxide, leaving the acid-insoluble metal sulfide.

The hydrogen treatment of the precipitated sulfide may be effected with considerable latitude. A paste of the precipitated sulfide may be heated in a current of hydrogen to remove the water or other liquid medium and the heating continued in hydrogen until the evolution of hydrogen sulfide has largely ceased. I have found these metal polysulfides to be unusually reactive toward hydrogen, so that it is sufficient to carry out the hydrogen treatment at relatively low temperatures in excess of 25° C. and especially in the range from 75 to 200° C. However, the hydrogen treatment may be carried out at temperatures above 200° C. if desired, but excessively high temperatures above 300° C. may impair the activity of the catalysts. The duration of the hydrogen treatment necessary to activate the catalyst may vary considerably and less time will be required the higher the temperature at which the treatment with hydrogen is done. Usually less than one hour is necessary at temperatures between 150° and 200° C. and at atmospheric pressure. The metal sulfides may be treated with hydrogen at ordinary pressure or at superatmospheric pressures, and inert gases or vapors may be present. It is obvious that this hydrogen reduction of the catalyst may be accomplished in the same apparatus that is used for the subsequent hydrogenation reaction. Moreover, the material to be catalytically hydrogenated may be present also, so that both the reduction of the catalyst and the hydrogenation for which it is to be used may be carried out in a single operation, as illustrated in the foregoing examples.

It is likewise a part of this invention to prepare the ferrous metal sulfides individually or in combination with each other. For example, active hydrogenation catalysts are obtained by reducing precipitated mixtures of cobalt and nickel, cobalt and iron, nickel and iron polysulfides. Moreover, the catalysts may be supported on carriers such as kieselguhr, silica gel, alumina, magnesia, or on metallic supports. For liquid-phase batch hydrogenation, it is preferable that the catalyst be in finely divided form. However, for continuous liquid and vapor phase hydrogenations, the catalyst may be formed into pellets, briquets, and the like, preferably prior to the hydrogen treatment.

The use of the metal sulfides prepared as herein described as catalysts for hydrogenation reactions, regardless of the nature of the material hydrogenated or the conditions under which the hydrogenation reaction is carried out, constitutes a part of this invention.

The exact nature of the metal sulfides prepared according to this invention is not known. It is well known that alkali polysulfides do not consist of a single chemical species. For example, a solution of sodium polysulfide corresponding to the formula $Na_2S_3$ probably contains such species as $Na_2S_2$, $Na_2S_3$, $Na_2S_4$, and $Na_2S_5$. Consequently the ferrous group metal sulfide obtained by mixing such a solution with a solution of a ferrous group metal salt may be a mixture of several different species. During the treatment of the metal sulfide with hydrogen, hydrogen sulfide is evolved indicating a reduction of higher sulfides to lower sulfides. As shown by way of example, a sample of precipitated cobalt sulfide that had been extracted with dilute acid to remove any cobalt hydroxide and with hot benzene to remove any free sulfur contained 1 part of cobalt to 1.65 parts of sulfur. After treating this material with hydrogen, the catalyst contained 1 part of cobalt to 0.76 part of sulfur. The catalyst may be in reality a mixture of cobalt sulfides of different cobalt-sulfur ratios. Similarly, a sample of nickel sulfide after hydrogen treatment contained 1 part of nickel to 1.05 parts of sulfur. It may be that greater reduction occurs on the surface of the catalyst particles than at the interior. Hence the invention is not limited to exact compositions. The ferrous group metal sulfides prepared according to the methods described, regardless of empirical composition, are active hydrogenation catalysts at unusually low temperatures.

The ferrous group metal sulfides prepared according to this invention are especially useful as catalysts for hydrogenation reactions involving sulfur compounds. For example, organic disulfides, thioketones, and thioaldehydes may be smoothly hydrogenated to the corresponding thiols by means of the catalysts prepared according to this invention. Furthermore, the hydrogenation of aldehydes, ketones, and nitriles in the presence of hydrogen sulfide to the corresponding thiols proceeds readily using the catalysts herein described. These catalysts are also useful for the hydrogen reduction of nitrates, nitrites, and a variety of unsaturated groups such as ethylenic, acetylenic, nitro, and carbonyl groups. Moreover, these reductions can be carried out in the presence of sulfur impurities or acids, which prevent the use of ordinary metal hydrogenation catalysts.

The metal sulfides prepared according to this invention are active hydrogenation catalysts at unusually low temperatures and at the same time are immune to poisoning by sulfur or its compounds. This combination of properties makes practicable for the first time the catalytic hydrogen reduction of certain sulfur compounds to the corresponding thiols, thus affording a new and highly economical method for obtaining these compounds. Moreover, the catalysts are resistant to poisoning and attack by organic acids, dilute mineral acids, alkalis, ammonia, and amines, enabling one to carry out hydrogenation reactions in the presence of these substances which in certain cases have hitherto required the use of noble metal catalysts. The unusual stability of these catalysts allows them to be used repeatedly for hydrogenation reactions with little decrease in activity.

It is apparent that many widely different embodiments of this invention may be made without departing from the spirit and scope thereof and therefore it is not intended to be limited except as indicated in the appended claims.

I claim:

1. The process for the preparation of ferrous group metal sulfide catalysts which comprises reacting a precipitated polysulfide of a metal of the iron group of the periodic table with hydrogen at a temperature between 25° and 200° C.

2. The process in accordance with claim 1 characterized in that the reaction is carried out at a temperature between 75° and 200° C.

3. The process for the preparation of ferrous group metal sulfide catalysts which comprises bringing a precipitated polysulfide of a metal of the iron group of the periodic table into contact with hydrogen at a temperature between 75° and 200° C. and continuing said contact until there is substantially no more evolution of hydrogen sulfide.

4. The process in accordance with claim 1 characterized in that the precipitated metal polysulfide is obtained by precipitation from a solution of a salt of said metal.

5. A process for the preparation of ferrous group metal sulfide catalysts which comprises bringing together in solution a salt of a metal of the iron group of the periodic table and an inorganic polysulfide, thereby precipitating a polysulfide of said metal and then treating said metal polysulfide with hydrogen at a temperature between 25° and 200° C.

6. The process in accordance with claim 5 characterized in that the treatment with hydrogen is continued until there is substantially no more evolution of hydrogen sulfide.

7. The process in accordance with claim 5 characterized in that the treatment with hydrogen is carried out at a temperature within the range of 75° to 200° C.

8. The process in accordance with claim 5 characterized in that the metal salt is a cobalt salt.

9. The process in accordance with claim 5 characterized in that the metal salt is a nickel salt.

10. The process in accordance with claim 5 characterized in that the metal salt is an iron salt.

11. A process for the preparation of ferrous group metal sulfide catalysts which comprises bringing together in an aqueous solution a salt of a metal of the iron group of the periodic table and an alkali polysulfide, and thereafter treating the precipitated metal polysulfide with hydrogen at a temperature between 25° and 200° C.

12. The process in accordance with claim 11 characterized in that the alkali polysulfide is a sodium polysulfide containing between 2 and 4 atoms of sulfur for each 2 positive univalent ions.

13. The process in accordance with claim 11 characterized in that the alkali polysulfide is an ammonium polysulfide containing between 2 and 4 atoms of sulfur for each 2 positive univalent ions.

14. The process in accordance with claim 11 characterized in that the precipitate is digested with a dilute acid under non-oxidizing conditions so as to remove any metal hydroxide therefrom.

15. A metal sulfide hydrogenation catalyst that is active at relatively low temperatures and in the presence of sulfur compounds, said catalyst being obtained by bringing together in solution a salt of a metal of the iron group of the periodic table with an inorganic polysulfide thereby precipitating a metal polysulfide, and thereafter treating the said precipitated metal polysulfide with hydrogen at a temperature between 25° and 200° C.

FRANK KERR SIGNAIGO.